(12) United States Patent
Kim et al.

(10) Patent No.: US 8,147,723 B2
(45) Date of Patent: Apr. 3, 2012

(54) POROUS ANODE ACTIVE MATERIAL, METHOD OF MANUFACTURING THE SAME, ANODE COMPRISING THE SAME, AND LITHIUM BATTERY COMPRISING THE ANODE

(75) Inventors: Hansu Kim, Seoul (KR); Jiman Kim, Suwon-si (KR); Chanho Pak, Seoul (KR); Soosung Kong, Gimje-si (KR); Jeongkuk Shon, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 12/397,629

(22) Filed: Mar. 4, 2009

(65) Prior Publication Data

US 2010/0051856 A1 Mar. 4, 2010

(30) Foreign Application Priority Data

Aug. 26, 2008 (KR) ........................ 10-2008-0083520

(51) Int. Cl.
*H01B 1/08* (2006.01)
*H01B 1/20* (2006.01)
*B05D 5/12* (2006.01)

(52) U.S. Cl. ............... 252/520.1; 252/182.1; 427/126.1; 216/13

(58) Field of Classification Search ............... 252/520.1, 252/182.1; 427/126.1; 216/13
See application file for complete search history.

(56) References Cited

U.S. PATENT DOCUMENTS

| | | | | |
|---|---|---|---|---|
| 6,319,427 B1* | 11/2001 | Ozin et al. | ............. | 252/301.4 F |
| 6,541,539 B1* | 4/2003 | Yang et al. | ............. | 523/200 |
| 6,716,378 B2* | 4/2004 | Yang et al. | ............. | 264/42 |
| 6,733,828 B2* | 5/2004 | Chao et al. | ............. | 427/239 |
| 7,001,669 B2* | 2/2006 | Lu et al. | ............. | 428/613 |
| 7,014,799 B2* | 3/2006 | Yang et al. | ............. | 264/44 |
| 7,176,245 B2* | 2/2007 | Stucky et al. | ............. | 516/111 |
| 7,252,908 B2* | 8/2007 | Kim et al. | ............. | 429/328 |
| 7,253,017 B1* | 8/2007 | Roscheisen et al. | ............. | 438/57 |
| 7,279,249 B2* | 10/2007 | Kim et al. | ............. | 429/231.9 |
| 7,291,782 B2* | 11/2007 | Sager et al. | ............. | 136/250 |
| 7,462,774 B2* | 12/2008 | Roscheisen et al. | ............. | 136/256 |
| 2002/0190415 A1* | 12/2002 | Yang et al. | ............. | 264/42 |
| 2003/0205853 A1* | 11/2003 | Yang et al. | ............. | 264/603 |
| 2005/0031958 A1 | 2/2005 | Fukuoka et al. | | |
| 2005/0098205 A1* | 5/2005 | Roscheisen et al. | ............. | 136/263 |
| 2006/0118493 A9* | 6/2006 | Chmelka et al. | ............. | 210/660 |
| 2007/0122701 A1 | 5/2007 | Yamaguchi | | |
| 2007/0256978 A1* | 11/2007 | Stucky et al. | ............. | 210/660 |

FOREIGN PATENT DOCUMENTS

| | | |
|---|---|---|
| JP | 2002-042808 | 2/2002 |
| JP | 2002042808 A * | 2/2002 |
| JP | 2002-117835 | 4/2002 |
| JP | 2004-095469 | 3/2004 |
| JP | 2005-56705 | 3/2005 |
| JP | 2007-069306 | 3/2007 |
| KR | 10-2007-0053140 | 5/2007 |
| KR | 10-2007-0059829 | 6/2007 |

OTHER PUBLICATIONS

Lyu et al., "Highly Stable Mesoporous Metal Oxides Using Nano-Propping Hybrid Gemini Surfactants", J. Am. Chem. Soc., 126 (2004), 2310-2311.*
Shon et al., "Nano-propping effect of residual silicas on reversible lithium storage over highly ordered mesoporous SnO2 materials", Journal of Materials Chemistry, 19 (2009), 6727-6732.*
Chen et al., "Preparation of Mesoporous SnO2-SiO2 composite as electrodes for lithium batteries", Chem. Commun., 2000, 2095-2096.*
Kruk, M. and M. Jaroniec, "Application of Large Pore MCM-41 Molecular Sieves to Improve Pore Size Analysis Using Nitrogen Adsorption Measurments", *Langmuir*, 13, 1997, pp. 6267-6273.
*Science* 276, 1395 (1997), Idota et al. Tin-Based Amorphous Oxide: A High-Capacity Lithium-Ion-Storage Material.
Search Report for Prior Art Before Application for Fuel Cell Operation Method, May 14, 2008.

* cited by examiner

*Primary Examiner* — Douglas Mc Ginty
(74) *Attorney, Agent, or Firm* — Stein McEwen, LLP (57) ABSTRACT

A porous anode active material including a Group 14 element oxide and a non-active material having no reactivity with lithium; a method of manufacturing the porous anode active material; an anode including the porous anode active material; and a lithium battery including the anode. The non-active material may be silica.

17 Claims, 9 Drawing Sheets

FIG. 5 ic # POROUS ANODE ACTIVE MATERIAL, METHOD OF MANUFACTURING THE SAME, ANODE COMPRISING THE SAME, AND LITHIUM BATTERY COMPRISING THE ANODE

CROSS-REFERENCE TO RELATED APPLICATION

This application claims the benefit of Korean Patent Application No. 2008-83520, filed on Aug. 26, 2008 in the Korean Intellectual Property Office, the disclosure of which is incorporated herein by reference.

BACKGROUND

1. Field

One or more embodiments relate to a porous anode active material, a method of manufacturing the porous anode active material, an anode including the porous anode active material, and a lithium battery including the anode.

2. Description of the Related Art

In general, graphite, which is a crystalline carbon, is used as an anode active material for lithium ion batteries. Graphite has excellent electrical capacity maintenance characteristics and excellent electrical potential characteristics, and thus is commercially used as an anode active material. However, even though graphite has these good characteristics, it has a low theoretical electrical capacity (hereinafter for simplicity, "electrical capacity" will be referred to as "capacity"). Because of this problem, research is actively underway to find alternatives to graphite. For example, Si, Sn, and Al, which are materials capable of forming an alloy with lithium, can be used as an anode active material.

However, although Si and Sn have higher capacities than graphite, Si and Sn swell when they form an alloy with lithium. Because of the swelling, the active material can become electrically isolated in part inside the electrode. The swelling also leads to an increase in specific surface area that leads in turn to acceleration of the electrolyte decomposition reaction.

To solve these problems, an amorphous Sn-based oxide can be used. For example, the particle size of Sn can be minimized and thereby agglomeration of Sn that occurs when a battery is charged or discharged can be prevented so as to obtain excellent capacity maintenance characteristics.

In another solution to these problems, tin oxide can be formed containing mesopores having a uniform diameter and shape in order to obtain a buffer space in an anode active material so that mechanical deterioration of the anode active material, which may happen during a swelling reaction with lithium, can be decreased (Japanese Patent No. 2002-042808). Use of nanopores may contribute to a decrease in mechanical stress caused by the swelling. However, use of the nanopores can only prevent mechanical stress up to a certain point and beyond this point the nano structure may be mechanically degraded. Therefore, these and/or other problems need to be solved.

SUMMARY

One or more embodiments include a porous anode active material incorporating a non-active phase having no reactivity with lithium as well as a method of manufacturing the porous anode active material. One or more embodiments include an anode incorporating the porous anode active material as an anode active material, and a lithium battery including the anode.

To achieve the above and/or other aspects, one or more embodiments may include a porous anode active material including 85-99 parts by weight of a Group 14 element oxide and 1-15 parts by weight of silica that exists in a non-active phase having no reactivity with lithium. The Group 14 element oxide may be selected from the group consisting of tin oxide ($SnO_2$), silicon oxide ($SiO_x$ where $0<X<2$), germanium oxide ($GeO_2$) and lead oxide (PbO). The Group 14 element oxide may have mesopores having a diameter of 2 to 50 nm. Group 14 is the preferred International Union of Pure and Applied Chemistry (IUPAC) name for the periodic table column formerly known as Group IVA. The term "silica" means $SiO_2$ which may also be known as "silicon dioxide." As stated above, silicon oxide varies in the ratio of oxygen to silicon.

To achieve the above and/or other aspects, one or more embodiments may include a method of manufacturing a porous anode active material, the method including: (a) immersing ordered mesoporous silica (OMS) in a Group 14 element salt-containing aqueous solution that includes a Group 14 element salt and a solvent; (b) heat treating the resultant product to form an OMS-Group 14 element oxide complex; and (c) etching the OMS-Group 14 element oxide complex with an acid solution or a base solution to obtain a porous anode active material including 85-99 parts by weight of a Group 14 element oxide; and 1-15 parts by weight of silica that exists in a non-active phase having no reactivity with lithium.

To achieve the above and/or other aspects, one or more embodiments may include an anode including the porous anode active material. To achieve the above and/or other aspects, one or more embodiments may include a lithium battery using an anode that includes the porous anode active material.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings, wherein like reference numerals refer to the like elements throughout. The embodiments are described below, by referring to the figures, to explain aspects of the present description.

Figure 1:
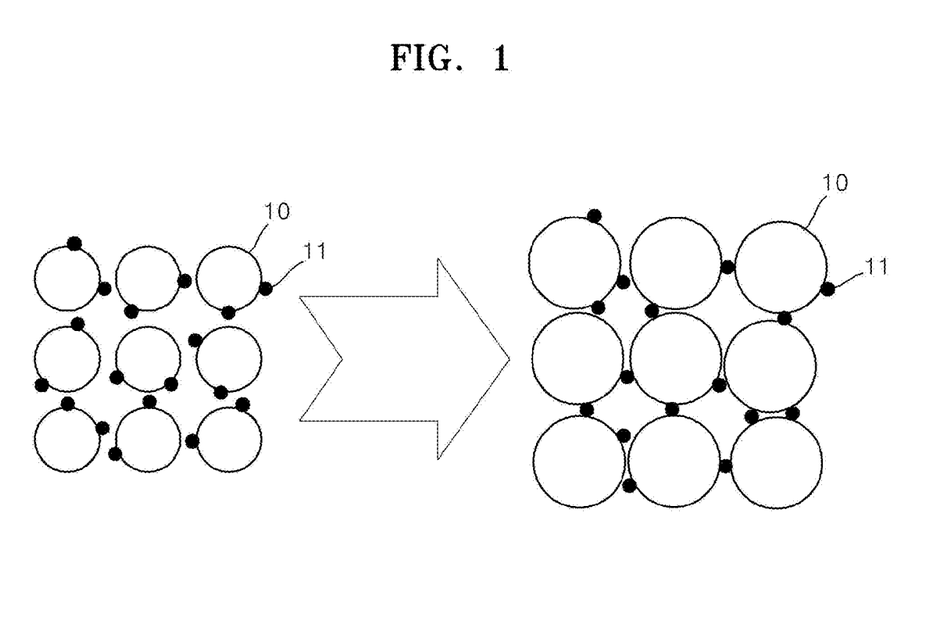
FIG. 1 is a view showing how stress generation is prevented when a porous anode active material according to an embodiment swells.

Hereinafter, a porous anode active material according to an embodiment will be described in detail. FIG. 1 is a view explaining how stress generation is prevented when a porous anode active material according to this embodiment swells.

Referring to FIG. 1, the porous anode active material according to this embodiment includes: a Group 14 element oxide 10; and silica 11 that exists in a non-active phase having no reactivity with lithium. The Group 14 element oxide 10 has mesopores. The silica 11 does not react with lithium and thus, the volume of the silica 11 does not change when a battery is charged or discharged.

The porous anode active material according to this embodiment has a stabilized structure obtained by including silica. Silica is inactive and provides a structure for the active material to be porous. Therefore, the porous anode active material has higher capacity than a conventional anode active material such as graphite that is a carbon-based material and has decreased mechanical stress caused by swelling when a battery is charged or discharged as illustrated in FIG. 1. Thus, a high capacity of the active material may be maintained.

Examples of the Group 14 element oxide 10 include tin oxide ($SnO_2$), silicon oxide ($SiO_x$ where $0<X<2$), germanium oxide ($GeO_2$), and lead oxide (PbO). In $SiO_x$, x may be 0.001 to 1.999, generally around 1.

In the porous anode active material according to this embodiment, the Group 14 element oxide 10 may have mesopores. An average diameter of mesopores may be 2 to 50 nm, generally 5 to 10 nm. If the average diameter of mesopores is less than 2 nm, the initial efficiency is lowered due to an increase in the specific surface area. On the other hand, if the average diameter of mesopores is greater than 50 nm, no swelling-prevention effect occurs when a battery is charged or discharged. In the porous anode active material according to this embodiment, the total volume of mesopores may be 0.1 to 0.3 $cm^3/g$, generally, 0.12 to 0.22 $cm^3/g$.

The Brunauer-Emmett-Teller (BET) surface area of the porous anode active material may be 50 to 100 $m^2/g$, generally 60 to 90 $m^2/g$. Herein, the BET surface area is measured by applying absorption amounts in a relative pressure range of 0.1 to 0.3 atmospheres as shown in an absorption equilibrium graph obtained through nitrogen absorption, to a BET equation.

In this embodiment, the volume and surface area of the mesopores are measured by referring to the nitrogen absorption characteristics. The nitrogen absorption is measured with a TRISTAR 3000 produced by Micromeritics Co.

In addition, in an X-ray diffraction analysis graph of the porous anode active material according to this embodiment, the main peak at the Bragg angle 2θ with respect to a CuK-alpha characteristic X-ray wavelength at 1.541 Å may be 1° or less, generally in the range of 0.5° to 1°. Additionally, one or two relatively weak peaks may appear between 1° and 2°. The composition of the porous anode active material may be identified by referring to locations of these peaks.

The content of silica 11 that exist in the non-active phase having no reactivity with lithium may be measured with an inductively coupled plasma—atomic emission spectrometer (ICP-AES). Based on the total amount of 100 parts by weight of the porous anode active material, the content of silica 11 may be 1 to 15 parts by weight and the content of the Group 14 element oxide 10 may be 85 to 99 parts by weight.

If the content of silica 11 is less than 1 part by weight, improvements in capacity maintenance of the porous anode active material caused by the presence of the non-reactive material are minimal. On the other hand, if the content of silica 11 is greater than 15 parts by weight, the excess amount of the non-active material decreases the capacity of the high-capacity active material and also decreases the conductivity of the high-capacity active material because the silica 11 is non-conductive.

Figure 2:
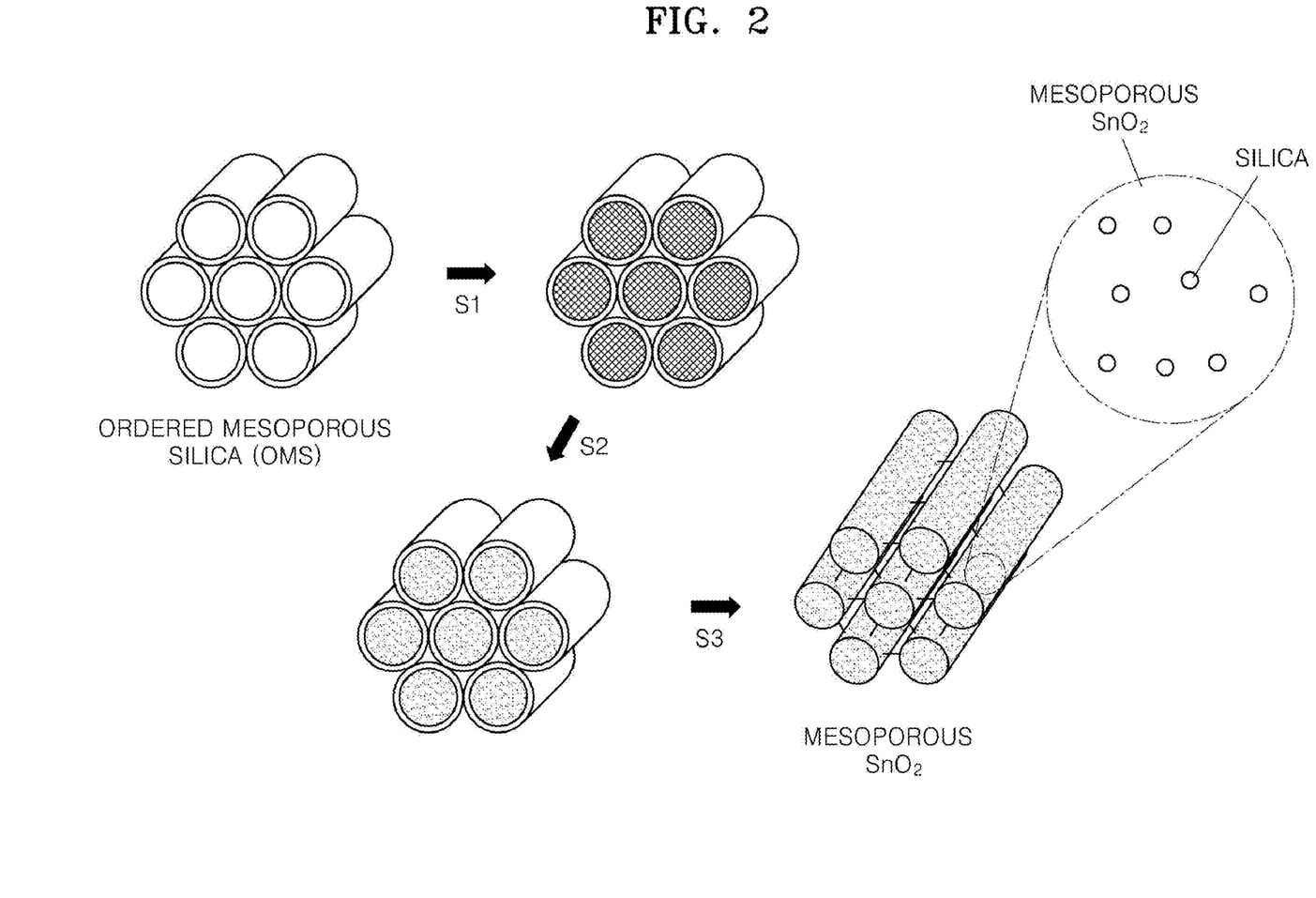
FIG. 2 is a view showing a method of manufacturing a porous anode active material, according to another embodiment.

A method of manufacturing a porous anode active material according to another embodiment will now be described with reference to FIG. 2. In this embodiment, tin (Sn) is used as the Group 14 element. FIG. 2 is a view showing a method of manufacturing a porous anode active material according to this embodiment.

First, an ordered mesoporous silica (OMS) template is immersed in a Group 14 element salt-containing solution that includes a Group 14 element salt and a solvent, wherein the Group 14 element salt is a precursor of the Group 14 element oxide (S1). The resultant product is thermally treated to form an OMS-Group 14 element oxide complex (S2).

In the OMS-Group 14 element oxide complex, the OMS may be filled with the Group 14 element oxide or the Group 14 element oxide may be present between silica crystals that form the OMS. The average diameter of the OMS-Group 14 element oxide complex may be 20 to 200 nm.

Examples of the Group 14 element salt may include at least one compound selected from the group consisting of $SnCl_4$, $SnCl_2$, $SnSO_4$, $Na_2SnO_3$, $PbSO_4$, $PbCl_2$, $GeCl_4$, $GeOCl_2$, $Na_2SiO_3$, $Li_2SiO_3$, and $Li_4SiO_4$. Examples of the solvent may include water, ethanol, methanol, acetone, and a mixture thereof. The content of the solvent may be 50 to 300 parts by weight based on 100 parts by weight of the Group 14 element salt. The content of the Group 14 element salt in the salt-containing solution may be 30-40 parts by weight based on 100 parts by weight of the OMS.

The heat treatment temperature may be 300 to 800° C. If the heat treatment temperature is lower than 300° C., the Group 14 element oxide is not sufficiently crystallized. On the other hand, if the heat treatment temperature is higher than 800° C., some mesopores of the OMS may collapse. The heat treatment time may be varied according to the heat treatment temperature. In this regard, the heat treatment time may be, for example, 2 to 3 hours. The heat treatment process may be performed in the presence of oxygen to prevent reduction of the Group 14 element salt.

The OMS used according to this embodiment may be any molecular sieve in which three-dimensional pores are connected by, for example, micropores. In this regard, such a molecular sieve may be KIT-6, SBA-1, SBA-15, or MCM-48. The immersion temperature may be room temperature (20-25° C.), but is not limited thereto.

Thereafter, the OMS-Group 14 element oxide complex may be etched with an acid solution or a base solution (S3). The acid solution may be an HF solution and the concentration of the HF solution may be 0.1 to 2 M. The base solution may be an NaOH solution or a KOH solution and the concentration of the NaOH solution or KOH solution may be 0.1 to 5M.

A porous anode active material according to this embodiment includes tin oxide as the Group 14 element oxide and silica, wherein the tin oxide has mesopores having a diameter of 2 to 50 nm. The silica may be present in the form of particles on the surface of the tin oxide. According to this embodiment, when the silica is present in the form of particles, silica particles may be attached to the surface of the tin oxide and an average diameter of the silica particles may be 20 to 200 nm.

The porous anode active material according to this embodiment includes silica that exists in the non-active phase, in addition to the tin oxide that has a high capacity and functions as the Group 14 element oxide. As a result, the porous anode active material is more stable and has better capacity characteristics and capacity maintenance characteristics than those of graphite. Such an improvement in capacity characteristics and capacity maintenance characteristics can be obtained by efficiently preventing mechanical degradation occurring when the porous anode active material swells or shrinks when combined with or separated from lithium.

Hereinafter, an electrode including a porous anode active material according to another embodiment and a lithium battery including the electrode will be described in detail. First, a porous anode active material according to this embodiment, a conductive material, a binder, and a solvent are mixed to form an anode active material forming composition. The anode active material forming composition is coated on a collector and then dried to form an anode.

Separately, a cathode active material, a conductive material, a binder and a solvent are mixed to form a cathode active material forming composition. Then, the cathode active material forming composition is coated on a collector and dried to form a cathode.

The cathode active material may be any lithium-containing metal oxide that is used in the art. The lithium-containing metal oxide may be $LiCoO_2$, $LiMn_xO_{2x}$, $LiNi_{x-1}Mn_xO_{2x}$ where x is 1 or 2, or $Li_{1-x-y}Co_xMn_yO_2$ where $0 \leq x \leq 0.5$ and $0 \leq y \leq 0.5$. The lithium-containing metal oxide may be $LiMn_2O_4$, $LiCoO_2$, $LiNiO_2$, or $LiFeO_2$.

In each of the cathode and anode active material forming compositions according to this embodiment, the conductive material may be carbon black and/or graphite particles. The binder may be a vinylidene fluoride/hexafluoropropylene copolymer, polyvinylidenefluoride (PVDF), polyacrylonitrile, polymethylmethacrylate, polytetrafluoroethylene, a styrene butadiene rubber-based polymer, a mixture thereof or a combination thereof. The solvent may be N-methylpyrrolidone, acetone, water, or a mixture thereof.

In each of the cathode active material forming composition and the anode active material forming composition, the active material, the conductive material, the binder, and the solvent may be used in amounts that are conventionally used in a lithium battery. In each of the cathode and anode active material forming compositions, the content of the conductive material may be 60 to 90 parts by weight based on 100 parts by weight of the corresponding electrode active material; the content of the binder may be 5 to 20 parts by weight based on 100 parts by weight of the corresponding electrode active material; and the content of the solvent may be 100 to 300 parts by weight based on 100 parts by weight of the corresponding electrode active material.

A separator may be included and may be any separator that is conventionally used in a lithium battery. The separator may have a low resistance to flow of electrolytic ions and excellent electrolytic solution-retaining characteristics. Examples of the separator may include glass fiber, polyethylene terephthalate (PET), polyethylene, polypropylene, polytetrafluoroethylene (PTFE), and combinations thereof, which materials or combinations may be non-woven or woven.

In detail, a lithium ion battery uses a winding type separator formed of polyethylene or polypropylene, and a lithium ion polymer battery uses a separator having an excellent organic electrolytic solution-retaining capability. A method of manufacturing these separators will now be described in detail.

A polymer resin, filler, and a solvent are mixed to prepare a separator composition. Then, the separator composition is directly coated on an electrode and dried to form a separator film. Alternatively, the separator composition is cast on a support and dried to form a separator film, and then the separator film is peeled from the support and laminated on an anode.

The polymer resin is not limited and can be any material that is used in a binder of an electrode plate. Examples of the polymer resin may include a vinylidene/hexafluoropropylene copolymer, polyvinylidenefluoride, polyacrylonitrile, polymethylmethacrylate, and a mixture thereof.

The electrolytic solution may include an organic solvent and a lithium salt, which are conventionally used in a lithium battery. Examples of the organic solvent include propylene carbonate (PC), ethylene carbonate (EC), fluoroethylene carbonate, diethyl carbonate (DEC), ethyl methyl carbonate, methyl propyl carbonate, butylene carbonate, benzonitrile, acetonitrile, tetrahydrofuran, 2-methyltetrahydrofuran, γ-butyrolactone, 1,3-dioxolane, 4-methyl-1,3-dioxolane, N,N-dimethylformamide, dimethylacetamide, dimethyl sulfoxide, 1,4-dioxane, 1,2-dimethoxyethane, sulfolane, chlorobenzene, nitrobenzene, dimethyl carbonate, diethyl carbonate, methyl isopropyl carbonate, ethyl propyl carbonate, dipropyl carbonate, dibutyl carbonate, diethylene glycol, dimethyl ether, and a mixture thereof. Examples of the lithium salt include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_4$, $LiAlCl_4$, $LiN(C_xF_{2x+1}SO2)(C_yF_{2y+1}SO_2)$ where x and y are natural numbers, LiCl, LiI, and a mixture thereof.

In the electrolytic solution, the concentration of the lithium salt may be 0.4 to 1.5 M. If the concentration of the lithium salt is less than 0.4 M, ionic conductivity of a lithium battery is low. On the other hand, if the concentration of the lithium salt is high than 1.5 M, decomposition of the lithium salt itself increases.

The separator is disposed between the cathode and the anode to form a battery assembly. The battery assembly is wound or folded into a cylindrical battery case or rectangular battery case and then, the electrolytic solution is loaded therein, thereby completing the manufacture of a lithium ion battery. In some cases, such battery assemblies may be deposited in a bi-cell structure and then immersed in an organic electrolytic solution. The resultant product is housed in a pouch and sealed, thereby completing the manufacture of a lithium ion polymer battery. A lithium battery according to this embodiment may be a primary lithium battery or a secondary lithium battery, generally a secondary lithium battery.

Other embodiments will be described in further detail with reference to the following examples. These examples are for illustrative purposes only and are not intended to limit the scope of the invention.

Comparative Manufacture Example 1

Synthesis Example of Porous Anode Active Material 1 g of tin chloride ($SnCl_4$) was dissolved in water to prepare a tin chloride-containing solution and then, 3 g of $SiO_2$ that functions as a template were immersed in 1 g of the tin chloride-containing solution. The resultant product was heat treated in an oxygen atmosphere at about 700° C. for 1 hour to form an ordered mesoporous silica (OMS)-tin oxide complex. The OMS-tin oxide complex was etched with a 1M HF solution for two hours to remove the OMS, thereby obtaining a porous anode active material.

Manufacture Example 1

Synthesis Example of Porous Anode Active Material

A porous anode active material was prepared in the same manner as in Comparative Manufacture Example 1, except that a 3M NaOH solution was used to etch the OMS-tin oxide complex instead of the 1M HF solution. The porous anode active material prepared according to Manufacture Example 1 was identified with a transmission electron microscope. The porous anode active material prepared according to Manufacture Example 1 consists of tin oxide nanorod assemblies each having mesopores with a diameter of 5 to 7 nm.

Manufacture Example 2

Synthesis Example of Porous Anode Active Material

A porous anode active material was prepared in the same manner as in Manufacture Example 1, except that a 1M NaOH solution was used to etch the OMS-tin oxide complex instead of the 1M HF solution.

Comparative Manufacture Example 2

Synthesis Example of Porous Anode Active Material

A porous anode active material was prepared in the same manner as in Comparative Manufacture Example 1, except that a 0.5M NaOH solution was used to etch the OMS-tin oxide complex instead of the 1M HF solution.

X-ray diffraction characteristics of the porous anode active materials prepared according to Manufacture Examples 1-2 and Comparative Manufacture Examples 1-2 were measured. The results are shown in FIGS. 3A and 3B.

Figure 3A:
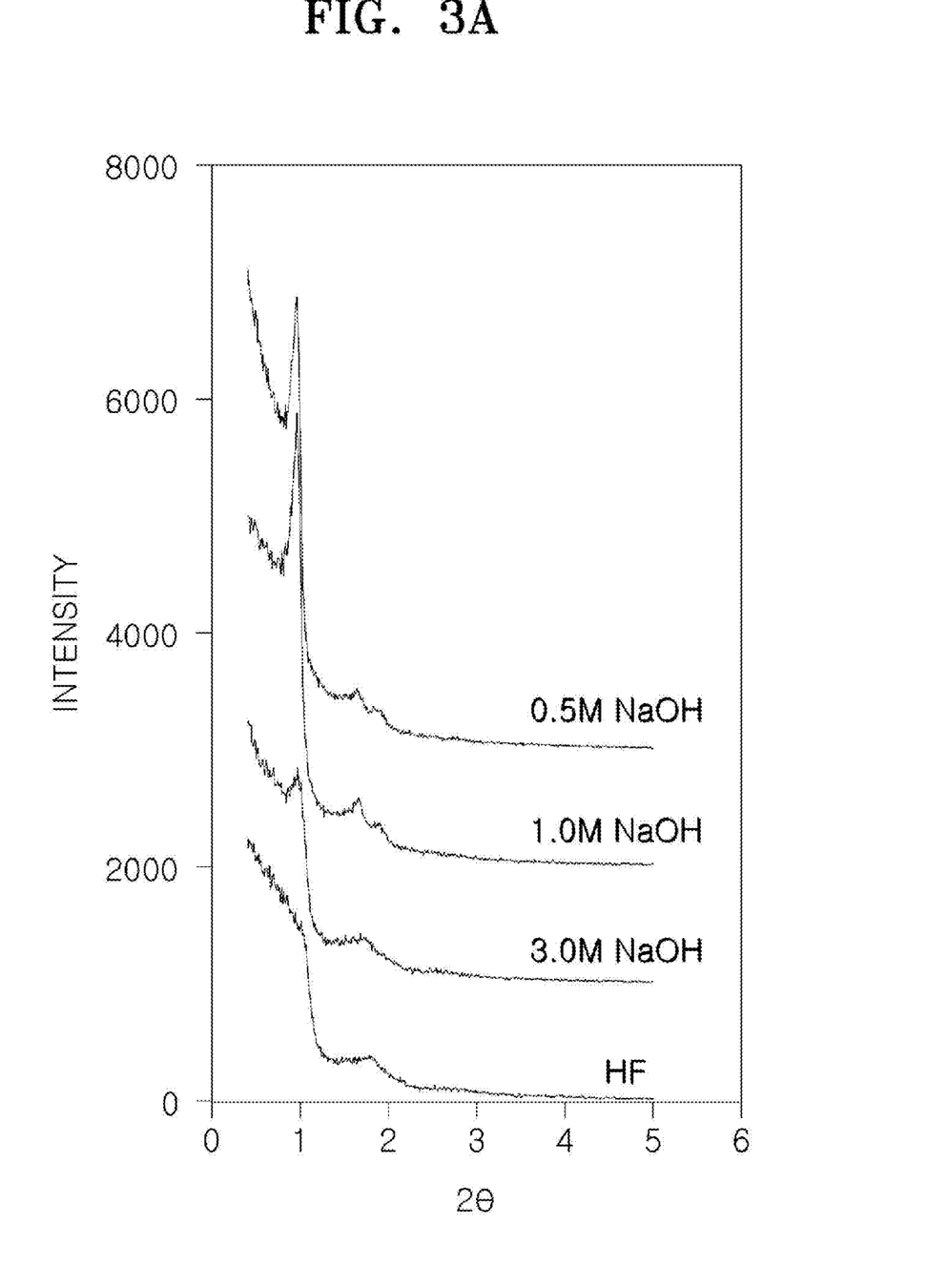
FIGS. 3A to 3B are graphs showing X-ray diffraction (XRD) analysis data of a porous anode active material according to other embodiments.
Figure 3B:
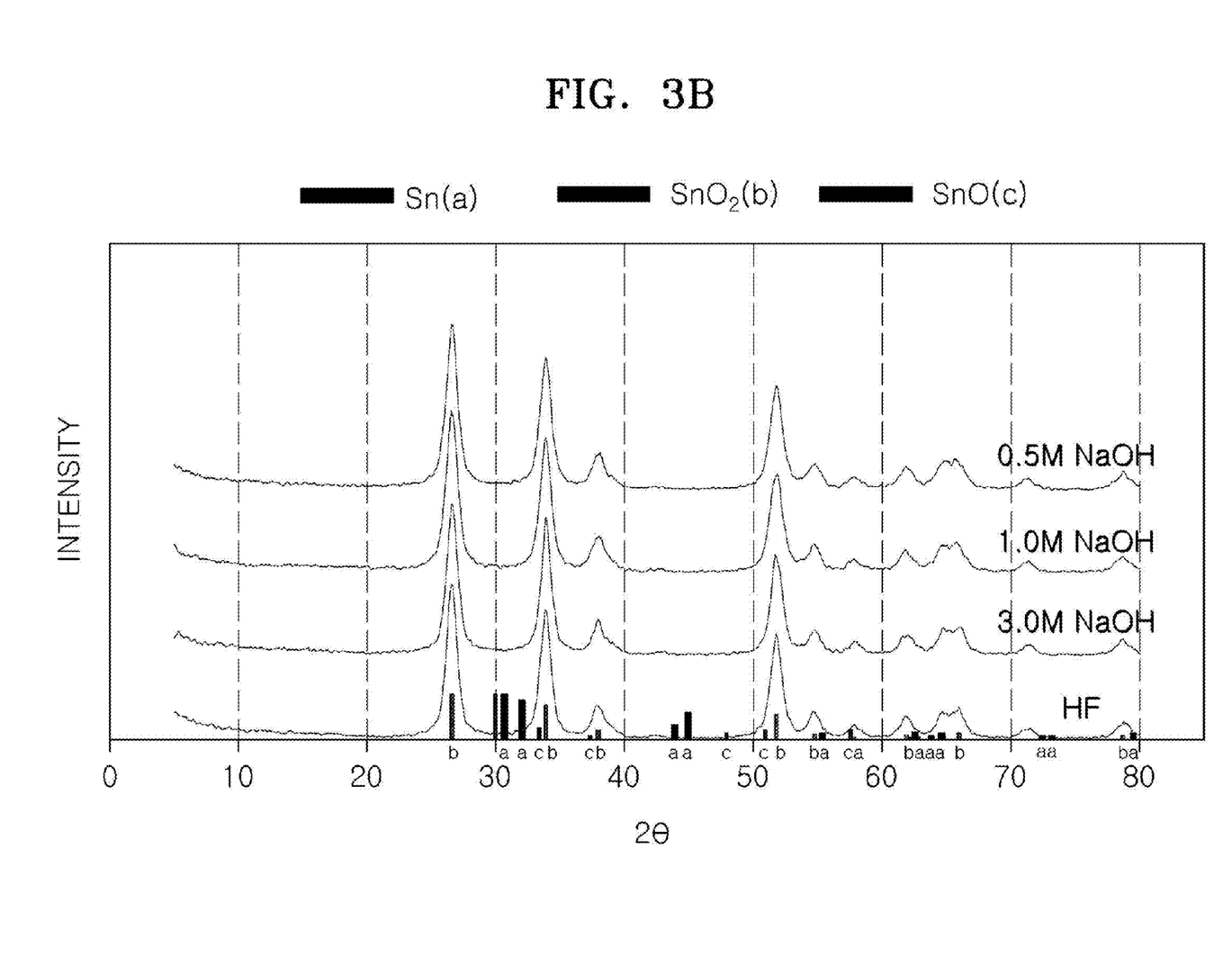

Referring to FIG. 3A, it can be seen that the porous anode active materials prepared according to Manufacture Examples 1-2 and Comparative Manufacture Examples 1-2 had a uniform diameter distribution of mesopores. Referring to FIG. 3B, it can be seen that the crystalline structure of tin oxide contained in each of the porous anode active materials prepared according to Manufacture Examples 1-2 and Comparative Manufacture Examples 1-2 was the same as that of $SnO_2$ before and after the non-active material was etched.

Figure 4A:
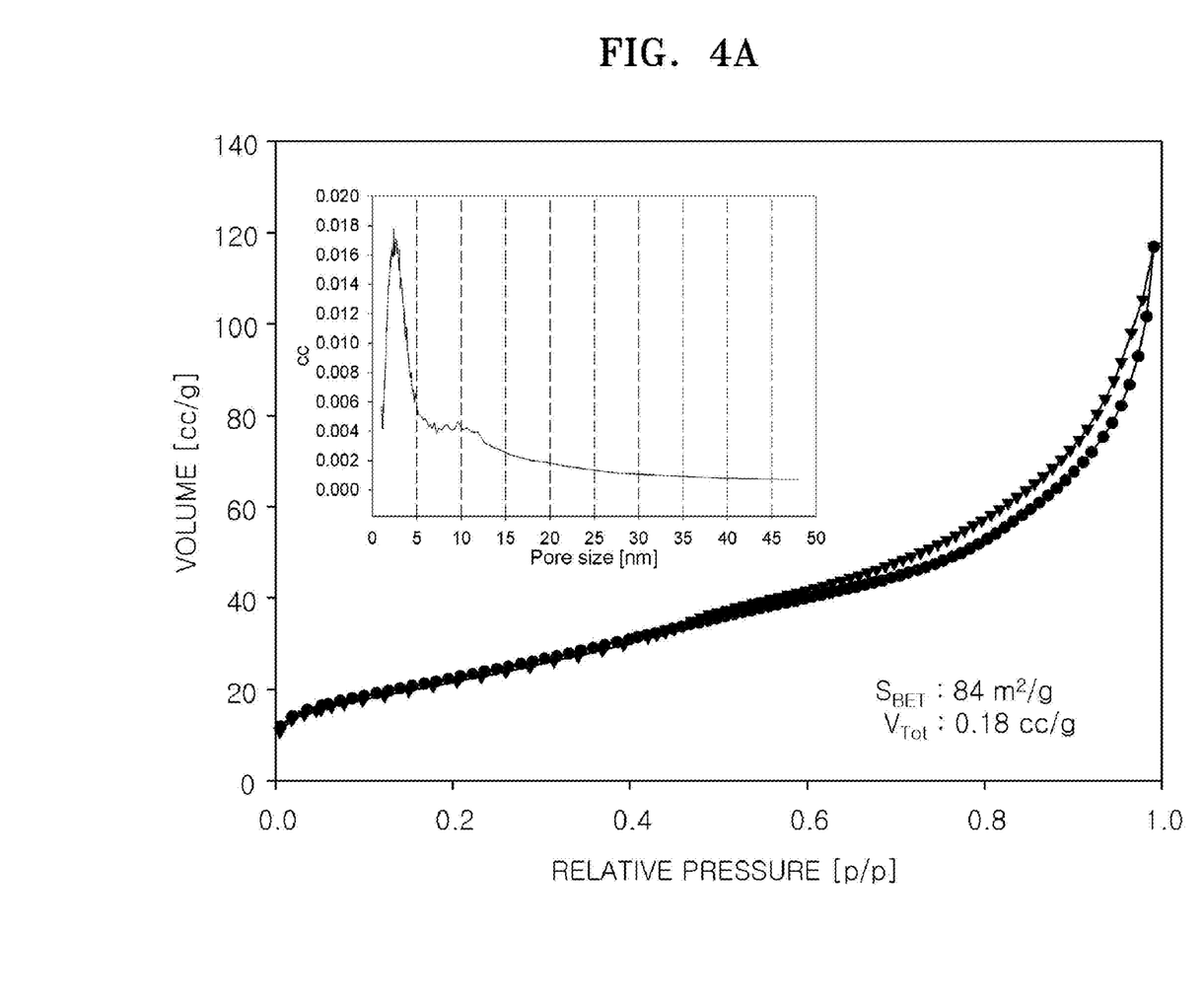
FIGS. 4A to 4D are graphs of volume as a function of specific surface area and pore volume characteristics of a porous anode active material according to the embodiments of FIGS. 3A and 3B.
Figure 4B:
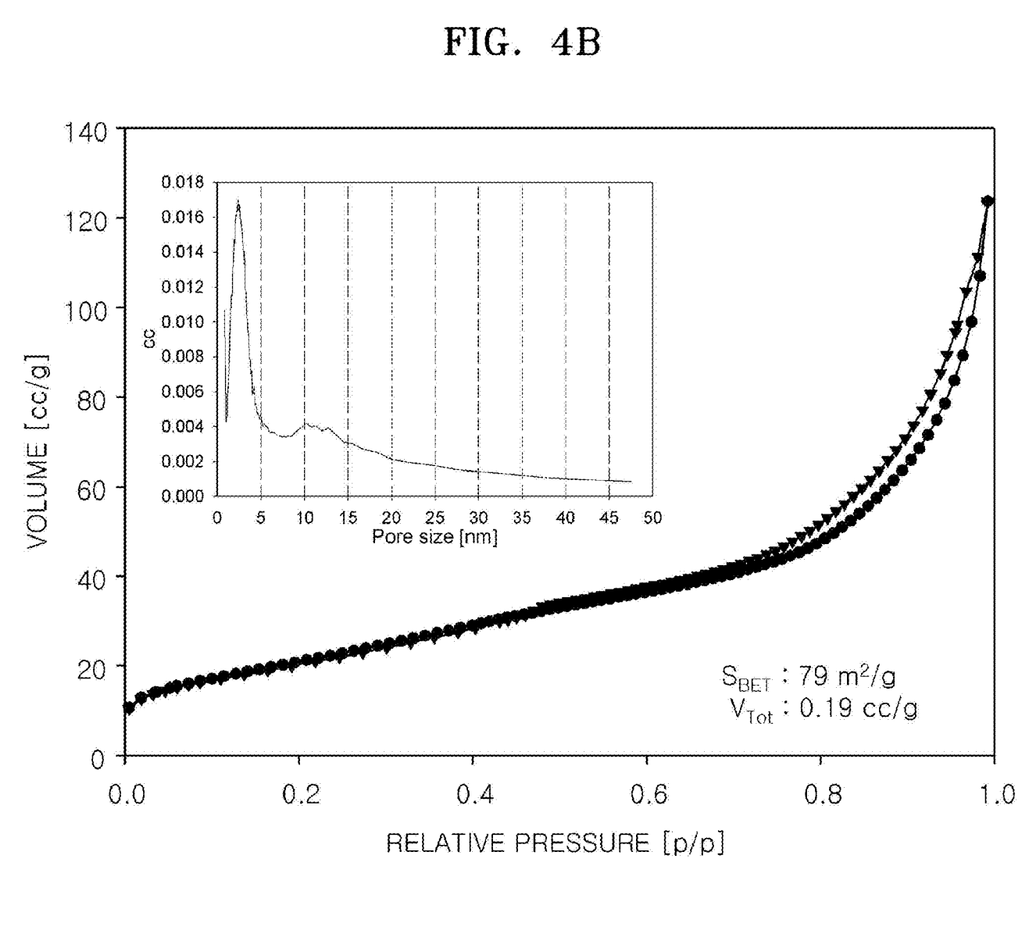
Figure 4C:
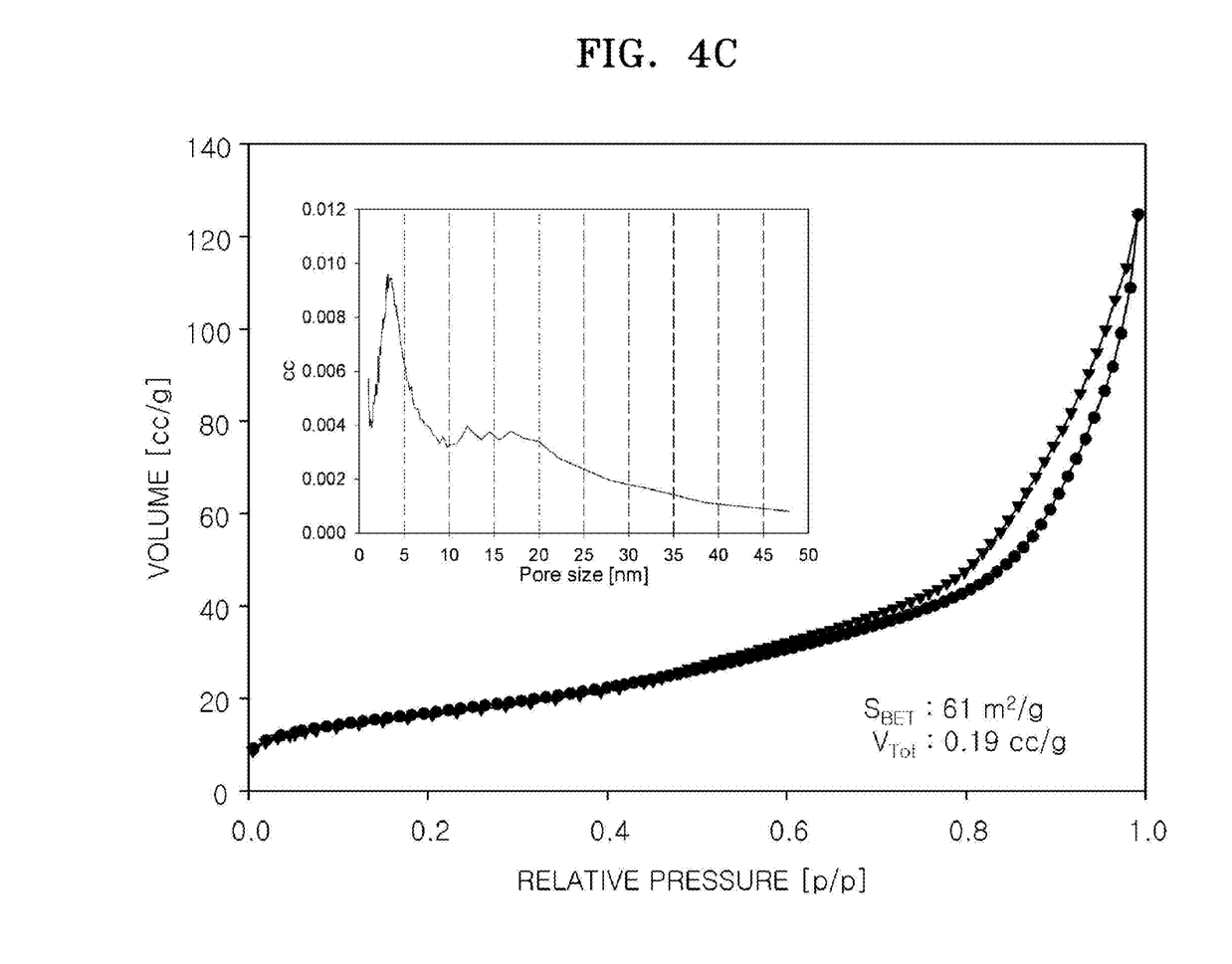
Figure 4D:
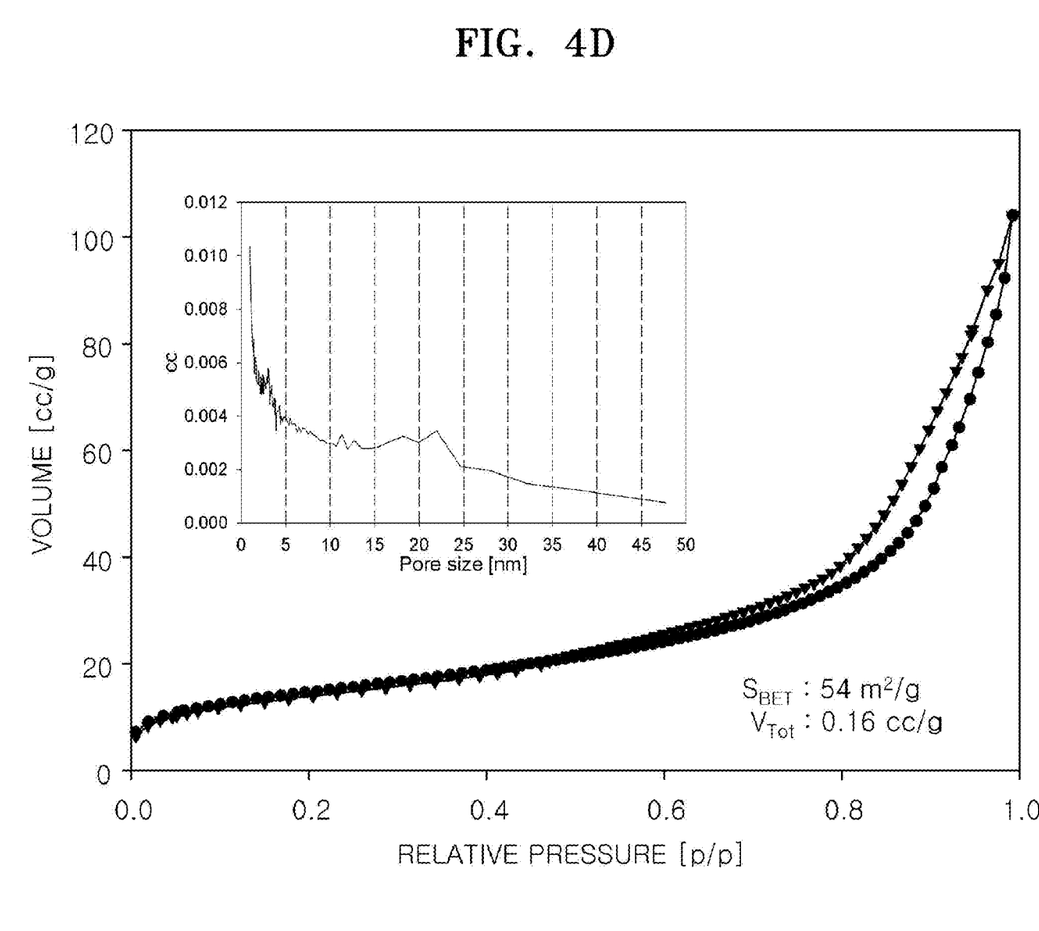

The surface areas and pore volume distributions of the porous anode active materials prepared according to Manufacture Examples 1-2 and Comparative Manufacture Examples 1-2 were measured using nitrogen absorbance characteristics. The results are shown in FIGS. 4A to 4D. The pore volume distribution was measured using a Barrett-Joyner-Halenda (B.J.H.) method, and the surface area was measured using a BET method. Herein, the B.J.H method is a method for calculating sizes of mesopores through a Kelvin equation and identifying the size distribution of mesopores, and the reference thereof is M. Kruk, M. Jaroniec, A. Sayari, Langmuir, 13, 6267 (1997). Referring to FIGS. 4A to 4B, it can be seen that the pore volume distributions were within those ranges described above.

With respect to each of lithium batteries including the porous anode active materials prepared according to Manufacture Examples 1-2 and Comparative Manufacture Examples 1-2, the content of silica that exists in a non-active phase was measured using ICP-AES. The results are shown in Table 1.

TABLE 1

| | Content of silica (weight %) |
|---|---|
| Comparative Manufacture Example 1 | 0.92 |
| Manufacture Example 1 | 3.87 |
| Manufacture Example 2 | 5.97 |
| Comparative Manufacture Example 2 | 17.44 |

Comparative Example 1

Manufacture of Lithium Battery

The porous anode active material prepared according to Comparative Manufacture Example 1, carbon black (Super-P, Timcal, Inc.), and polyvinylidenefluoride that functioned as a binder were mixed in a weight ratio of 70:15:15 to prepare an anode active material layer forming slurry. Then, the anode active material layer forming slurry was applied to a copper (Cu) foil and a doctor blade was used to form an anode active material layer having a thickness of 50 microns. The anode active material layer was vacuum-dried at 120° C. for 2 hours to form an anode.

The anode, a lithium layer that functioned as a cathode, a polypropylene layer (Cellgard 3510) that functioned as a separator, and a mixture of 1.3M $LiPF_6$ and EC:DEC in a weight ratio of 3:7 that functioned as an electrolytic solution were used to form a lithium battery. The lithium battery was a coin-type battery.

Charge and discharge characteristics of the lithium battery were measured. To measure charge and discharge characteristics, the lithium battery was charged until the voltage was 0.001 V and then discharged until the voltage was 1.5 V, and this cycle of charging and discharging was performed 50 times. In this regard, a current of 50 mA was used for 1 g of each electrode.

Example 1

Manufacture of Lithium Battery

A lithium battery was manufactured in the same manner as in Comparative Example 1, except that the porous anode active material prepared according to Manufacture Example 1 was used instead of the porous anode active material prepared according to Comparative Manufacture Example 1.

Example 2

Manufacture of Lithium Battery

A lithium battery was manufactured in the same manner as in Comparative Example 1, except that the porous anode active material prepared according to Manufacture Example 2 was used instead of the porous anode active material prepared according to Comparative Manufacture Example 1.

Comparative Example 2

Lithium Battery

A lithium battery was manufactured in the same manner as in Comparative Example 1, except that the porous anode active material prepared according to Comparative Manufacture Example 2 was used instead of the porous anode active material prepared according to Comparative Manufacture Example 1.

Reference Example 1

Manufacture of Lithium Battery

A lithium battery was manufactured in the same manner as in Comparative Example 1, except that graphite was used instead of the porous anode active material prepared according to Comparative Manufacture Example 1.

Figure 5:
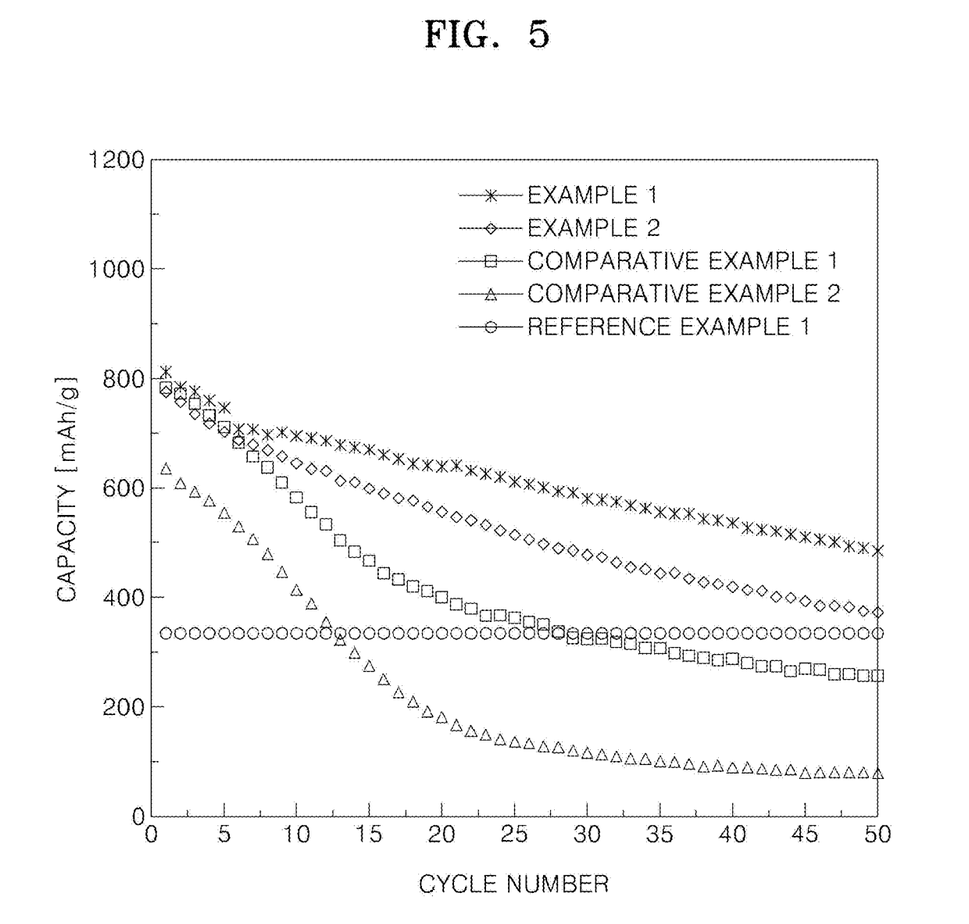
FIG. 5 is a graph of capacity as a function of charge-discharge cycle number of a lithium battery according to another embodiment.

Capacity characteristics with respect to cycle number of the lithium batteries prepared according to Examples 1-2, Comparative Examples 1-2 and Reference Example 1 were measured. The results are shown in FIG. 5. Referring to FIG. 5, it can be seen that the lithium batteries including the porous anode active materials prepared according to Examples 1-2 had better capacity characteristics and capacity maintenance characteristics than the lithium batteries prepared according to Reference Example 1 and Comparative Example 1-2.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A porous anode active material comprising:
   85-99 parts by weight of a mesoporous Group 14 element oxide; and
   1-15 parts by weight of silica that is formed in particles attached to the surface of the mesoporous Group 14 element oxide and exists in a non-active phase having no reactivity with lithium.

2. The porous anode active material of claim 1, wherein the mesoporous Group 14 element oxide is selected from the group consisting of tin oxide ($SnO_2$), silicon oxide ($SiO_x$ where $0<x<2$), germanium oxide ($GeO_2$) and lead oxide (PbO).

3. The porous anode active material of claim 1, wherein the mesoporous Group 14 element oxide has mesopores having a diameter of 2 to 50 nm.

4. A method of manufacturing a porous anode active material, the method comprising:
   immersing ordered mesoporous silica (OMS) in a Group 14 element salt-containing aqueous solution that comprises a Group 14 element salt and a solvent;
   heat treating the resultant product to form an OMS-Group 14 element oxide complex; and
   etching the OMS-Group 14 element oxide complex with an acid solution or a base solution to obtain a porous anode active material comprising: 85-99 parts by weight of a mesoporous Group 14 element oxide; and 1-15 parts by weight of silica that exists in a non-active phase having no reactivity with lithium.

5. The method of claim 4, wherein the Group 14 element salt comprises at least one compound selected from the group consisting of $SnCl_4$, $SnCl_2$, $SnSO_4$, $Na_2SnO_3$, $PbSO_4$, $PbCl_2$, $GeCl_4$, $GeOCl_2$, $Na_2SiO_3$, $Li_2SiO_3$, and $Li_4SiO_4$.

6. The method of claim 4, wherein the base solution is selected from an NaOH solution and a KOH solution.

7. The method of claim 4, wherein the acid solution is an HF solution.

8. The method of claim 4, wherein the heat treating is performed in an oxygen atmosphere at a temperature of 300 to 800° C.

9. An anode comprising the porous anode active material of claim 1.

10. An anode comprising the porous anode active material of claim 2.

11. An anode comprising the porous anode active material of claim 3.

12. A lithium battery comprising an anode that comprises the porous anode active material of claim 1.

13. The porous anode active material of claim 2, wherein the X in $SiO_x$ is 1.

14. The porous anode active material of claim 3, wherein the mesoporous Group 14 element oxide mesopores have a diameter of 5 to 10 nm.

15. The porous anode active material of claim 3, wherein:
   the mesoporous Group 14 element oxide is tin oxide, and
   the average diameter of the silica particles is 20 to 200 nm.

16. The method of claim 4, wherein the heat treating is performed for 2 to 3 hours.

17. A method of manufacturing an anode comprising a porous anode active material, the method comprising:
   mixing the porous anode active material with a conductive material, a binder and a solvent to form an anode active material forming composition;
   coating the anode active material forming composition on a collector; and
   drying the combination of the anode active material forming composition and the collector, wherein:
   the porous anode active material comprises 85-99 parts by weight of a mesoporous Group 14 element oxide,
   the porous anode active material comprises 1-15 parts by weight of silica that exists in a non-active phase having no reactivity with lithium,
   the mesoporous Group 14 element oxide is selected from the group consisting of tin oxide ($SnO_2$), silicon oxide ($SiO_x$ where $0<x<2$), germanium oxide ($GeO_2$) and lead oxide (PbO), and
   the mesoporous Group 14 element oxide has mesopores having a diameter of 2 to 50 nm.

* * * * *